April 9, 1963 E. G. WOOD 3,084,474

MEMORANDA AND DIRECTORY SUPPORT FOR CRADLE-TYPE TELEPHONES

Filed May 11, 1961

INVENTOR

ERVIN G. WOOD

BY Mason, Mason & Albright

ATTORNEYS

United States Patent Office 3,084,474 Patented Apr. 9, 1963

3,084,474

MEMORANDA AND DIRECTORY SUPPORT FOR CRADLE-TYPE TELEPHONES

Ervin G. Wood, 1611 3rd Ave. SE., Aberdeen, S. Dak.

Filed May 11, 1961, Ser. No. 109,351
6 Claims. (Cl. 45—.5)

This invention relates to a support for a small telephone directory such as is found in the smaller cities and towns. More particularly, the invention is directed to a support for such directories or memoranda for homes and offices which can be effectively attached to the telephone and will not damage or require any alteration of the telephone.

Supports of this type are not unknown to the art. An example of such support is disclosed in Patent No. 1,983,443 to Duceska et al. Another example may be found in Patent No. 2,604,724 issued to Watts. However, it is to be noted that in these as well as other holders in the prior art, the holders are secured to the telephone in such a manner that with the passage of time a certain amount of wear and tear will occur on certain portions of the exterior surfaces of the telephone. Moreover, since the means employed to grasp a part of the telephone are generally frictional, the prior art holders are subject to frequent dislocation by movement or vibration of the telephone. Additionally, the position of such a holder may be easily changed or the holder may be disengaged entirely from the telephone when it is used as a surface for writing or otherwise disturbed. For these and other reasons, as will be appreciated by those skilled in the art, the prior art supports of the type involved have not proved entirely satisfactory and for this reason have not been widely accepted.

It is thus the object of this invention to provide an improved holder for thin telephone directories and the like, as well as memoranda, including a pencil holder, which is conveniently attachable to the telephone; which does not damage the telephone; which does not interfere with the proper functioning or operation of the telephone; and which is neat in appearance in conjunction with the telephone.

The invention is illustrated in its preferred embodiment in the accompanying drawings in which.

Figure 1:
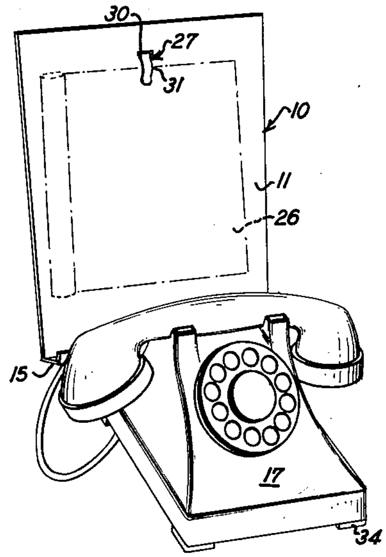
FIGURE 1 is a perspective view showing the holder of this invention in place.

The holder, which is designated in the figures generally as 10, comprises a flat surface portion 11 with a bracket 12 riveted thereto at the lower aspect of the flat surface portion 11 by countersunk rivets 13 and 14 or other securing means. The flat surface portion 11 is made of a suitable light-weight plastic and has a trough portion 15 formed horizontally across its lower aspect.

The bracket 12 is formed of a high quality steel, preferably a spring-type steel, so that the bracket is not readily deformable from its shape. However, it is to be understood that this steel is of a relatively heavy gauge so that movement by the holder is correspondingly minimal with the usual forces which are exerted thereon. Bracket 12 is so formed that on its lower part it has a U-shaped bend or portion 24 which terminates in a securing portion comprising a flat bifurcated part 16.

Figure 3:
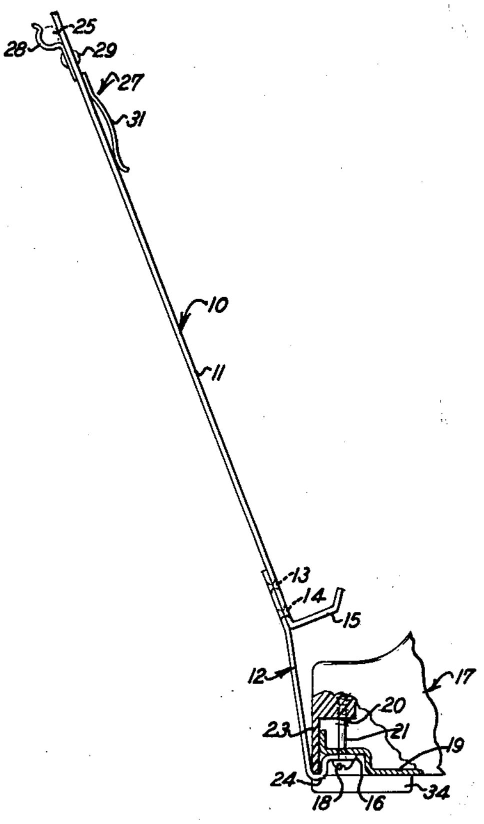
FIGURE 3 is a side view of the invention shown attached to the rear of a telephone base, part of which is broken away and part shown in section.

The standard telephone 17 in use in this country has a screw 18 countersunk in a formed depression in the rear lower portion of its bottom 19 to aid in holding bottom 19 in place. This screw is usually of a type whereby threaded portion 20 has an over-all diameter greater than its shaft portion 21. Slot 22 in the bifurcated part 16 has parallel sides, and the breadth of slot 22 is such that it wil fit snugly around the shaft 21 of screw 18, as shown in FIGURE 3. Thus, when the bracket 12 is placed as shown in FIGURE 3 and screw 18 is tightened to force the bifurcated part 16 against the bottom 19, bracket 12 is held snugly in place between the bottom 19, screw 18, shaft 21, and the rearward part 23 of telephone 17. This fit has been found in practice to insure the integrity of the bracket 12 together with the holder 10. In fact, holder 10 can not be removed until screw 18 is unscrewed so that the bifurcated part 16 clears the lower edges of the telephone's rearward part 23.

Figure 2:
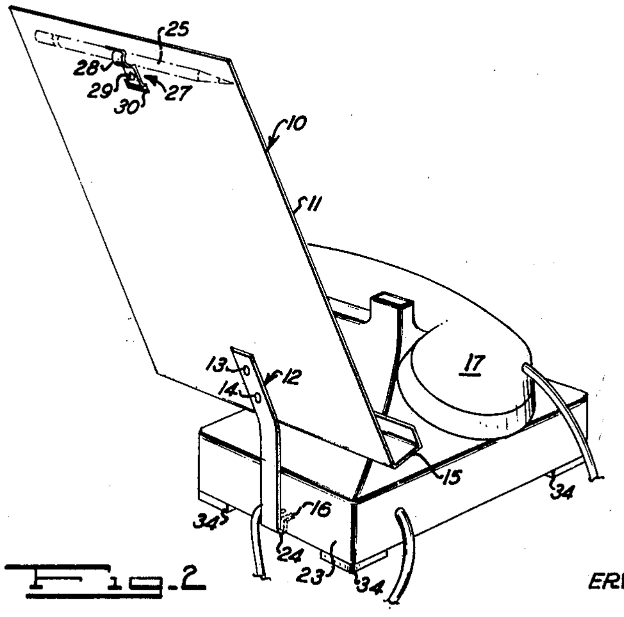
FIGURE 2 is a further perspective view of the holder showing its connection to the telephone from the rear.
Figure 4:
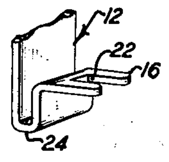
FIGURE 4 is an enlarged perspective view illustrating the support bracket.

Referring now to FIGURES 2 and 3, it wil lbe noted that the bracket 12 is so formed that the U-shaped portion 24 curves around part 23 of the telephone and the bracket extends vertically upward relative to part 23 of the telephone 17 so that there is no contact between the bracket 12 and the external surface of telephone 17. The top portion of bracket 12 has a rearward bend of about 15° relative to part 23 of the telephone. Nor does bracket 12 bear on the table or desk upon which telephone 17 rests inasmuch as pads 34 support the telephone 17 at a sufficient height to permit the U-shaped portion to pass under part 23 without touching the surface of the table or desk upon which telephone 17 rests.

The pencil 25 and/or the telephone memoranda 26 are held in place by a single spring piece 27 composed of a light-gauge spring strip. It will be noted from FIGURES 2 and 3 that strip 27 has an arcuate portion 28 in its upper aspect for grasping the pencil and is secured to the holder 10 by a single rivet 29 or other suitable securing means. Below rivet 29 strip 27 curves through an opening 30 in the holder 10 and continues downwardly with a slightly bowed shape 31 to constitute the spring grasping means for thetelephone memoranda 26.

As shown in FIGURE 1, the flat surface portion 11 of holder 10 is formed with its width at the top slightly greater than the width in the lower aspect for purposes of appearance, but the exact shape and size of the flat surface portion 11 may be varied within the choice of one working in the art.

When a small directory or memorandum pad is placed in position on the holder 10, its weight will react on bracket 12 in such a manner that the holder 10 will move slightly away from the telephone 17.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In combination with a telephone having a vertically disposed screw with its head extending through the telephone's bottom portion proximate to the rear side of the telephone, a telephone directory support comprising a flat surface portion, a substantially vertically disposed bracket connected on its upper end to said flat surface portion and having a U-shaped part at its lower aspect, said U-shaped part spaced around the lower rear side of said telephone, a horizontal securing portion of said bracket extending normally from said U-shaped part, a receiving space in said securing portion for receiving the shaft of the aforesaid screw with the head of said screw bearing against said securing portion whereby said bracket is thereby clamped on the underside of said telephone and extends upwardly from its U-shaped portion spaced from the rear side of said telephone.

2. The structure of claim 1 wherein said receiving space is a slot in said securing portion.

3. The structure of claim 1 wherein said bracket is composed of spring steel.

4. The structure of claim 1 wherein said flat surface portion is disposed at an angle of approximately 15° relative to the rear side of said telephone.

5. The structure of claim 1 wherein a horizontally disposed trough portion is connected to the lower aspect of said flat portion.

6. In combination with a cradle-type telephone having a vertically disposed screw with its head extending through the telephone's bottom portion centrally proximate to the rear side of said telephone, a telephone directory support comprising a flat surface portion composed of a sheet of plastic, a horizontal trough extending from the lower aspect of said flat portion composed of the same sheet of plastic, a vertically disposed bracket centrally secured to the lower flat surface portion, a U-shaped part of said bracket in its lower aspect, said U-shaped part surrounding the lower rear side of said telephone in a nonengaging fashion with reference to the outer surface of said side, a horizontal securing portion of said bracket extending normally from said U-shaped part, a slot in said securing portion adapted to receive snugly the shaft of the aforementioned screw with the head of said screw bearing against said securing portion whereby said bracket is thereby clamped to said telephone at its bottom and extends upwardly spaced from the rear of said telephone and outwardly therefrom.

References Cited in the file of this patent

UNITED STATES PATENTS

| | | |
|---|---|---|
| 786,263 | Bumgardner | Apr. 4, 1905 |
| 856,177 | Meyers | June 4, 1907 |
| 1,170,479 | Corey | Feb. 1, 1916 |
| 2,604,724 | Watts | July 29, 1952 |
| 2,731,764 | Zeller | Jan. 24, 1956 |
| 2,807,369 | Stark | Sept. 24, 1957 |